(No Model.)   2 Sheets—Sheet 1.

A. EDWARDS.
CORNSTALK PULLER.

No. 544,573.   Patented Aug. 13, 1895.

Witnesses

Inventor
Arthur Edwards
By Alexander Davis
Attorneys (No Model.) 2 Sheets—Sheet 2.
A. EDWARDS.
CORNSTALK PULLER.
No. 544,573. Patented Aug. 13, 1895.
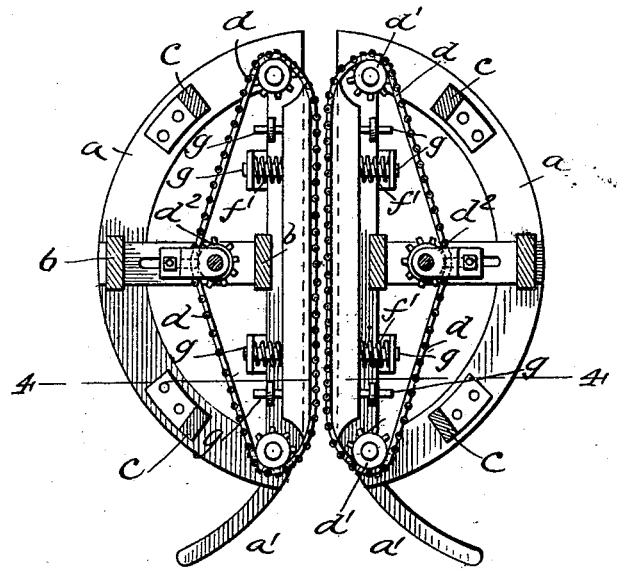
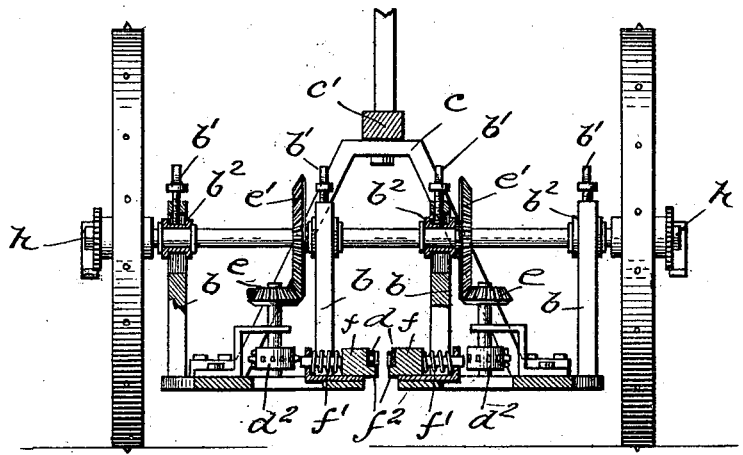
Witnesses
G. M. Lamasure
Chas. A. Muzzy
Inventor
Arthur Edwards
By Alexander & Davis
Attorneys

UNITED STATES PATENT OFFICE.

ARTHUR EDWARDS, OF WILLOW SPRINGS, MISSOURI, ASSIGNOR OF ONE-HALF TO MAT P. SMITH AND SARAH A. DAHL, OF SAME PLACE.

CORNSTALK-PULLER.

SPECIFICATION forming part of Letters Patent No. 544,573, dated August 13, 1895.

Application filed May 13, 1895. Serial No. 549,048. (No model.)

*To all whom it may concern:*

Be it known that I, ARTHUR EDWARDS, a citizen of the United States, residing at Willow Springs, in the county of Howell and State of Missouri, have invented certain new and useful Improvements in Cornstalk-Pullers, of which the following is a specification, reference being had therein to the accompanying drawings.

Figure 1:
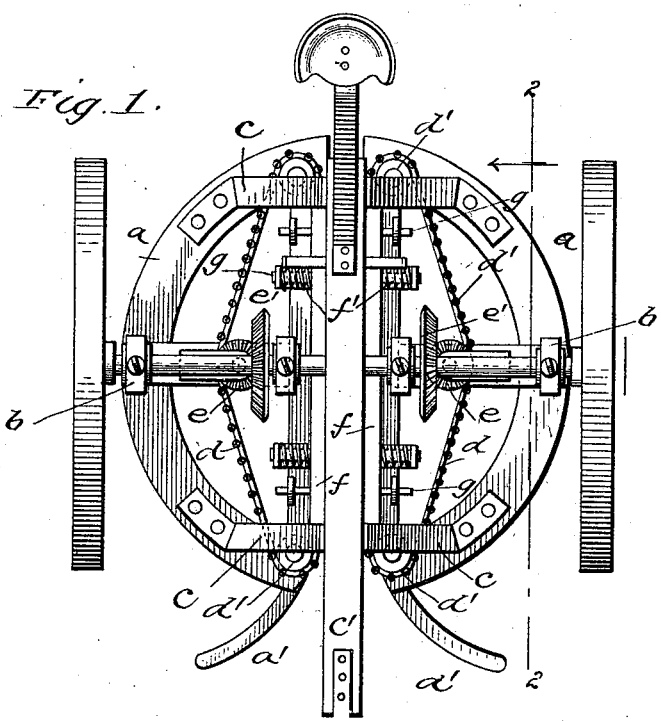
Figure 2:
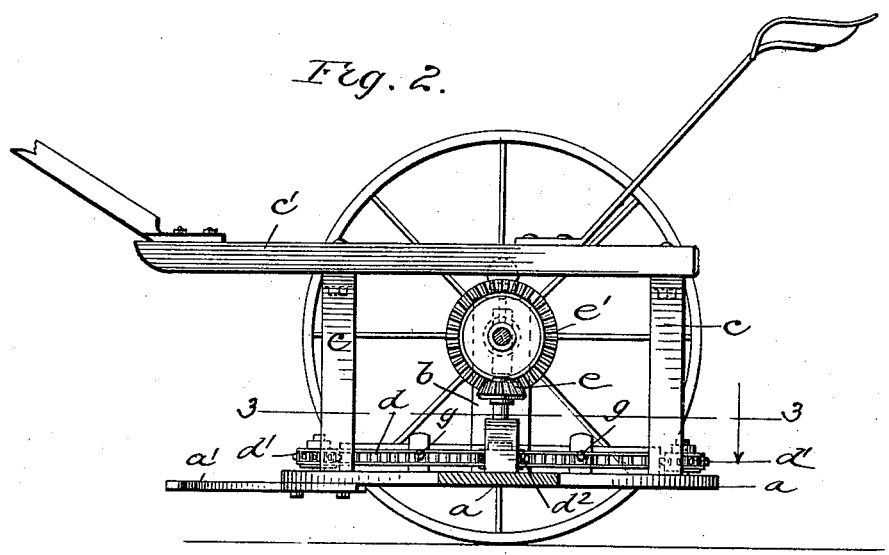

In the drawings, Figure 1 is a plan view of my machine. Fig. 2 is a vertical section on the line 2 2 of Fig. 1. Fig. 3 is a horizontal section on the line 3 3 of Fig. 3, and Fig. 4 is a vertical section taken on the line 4 4 of Fig. 3.

This invention is designed to produce a strong and simple machine for rapidly and efficiently pulling cornstalks; and it consists of certain novel features of construction hereinafter described, and pointed out in the claims.

The frame of the machine consists of two horizontal semicircular sections $a$ $a$, whose straight edges come close together at or near the central draft-line of the machine, and form a channel or passage through which the stalks pass, the front end of each frame being provided with an outwardly-curved gatherer $a'$ to direct the stalk into the passage. Each frame is hung from the axle by means of a pair of hangers $b$, the upper ends of which are vertically slotted for the passage of the axle, and in order to raise and lower the sections a set-screw or bolt $b'$ is tapped through the upper end of each hanger, and bears upon a suitable collar $b''$ carried by the axle. The sections are connected both in front and in the rear of the axle by rigid bows $c$, which straddle the line of stalks, and are connected together by the central longitudinal beam $c'$, which carries the driver's seat and draft-irons or tongue. Mounted upon each frame is an endless sprocket-chain $d$, which runs upon horizontal sprocket-wheels $d'$, carried by short vertical shafts supported on the frame, one sprocket-wheel being journaled near the front of the stalk-passage and the other near the rear end thereof. To drive each chain a sprocket-wheel $d^2$ is employed, said sprocket-wheel being secured upon a vertical shaft journaled in the frame directly below the axle, said vertical shaft carrying a bevel-gear $e$ at its upper end which meshes with a larger bevel-gear $e'$ carried by the axle. The inner portion of each chain travels upon a horizontal shoe $f$, which is slidingly mounted upon the inner frame-bars of the frame-section, and is kept pressed normally toward the central line of the stalk-passage by means of coil-springs $f'$ interposed between the shoe and suitable stops on the section. Each shoe is flanged along its inner lower corner at $f^2$, forming a ledge on which the chain rests as it passes rearward. Each shoe extends from near the front sprocket-wheels $d'$ to near the rear sprocket-wheels, and their inner forward and rear ends being rounded off slightly to facilitate the passage of the chains on and off the shoes. To guide the shoes in their horizontal movements, guide-rods $g$ are secured to their outer edges and passed through suitable lugs carried by the frame.

It will be observed that when the machine is moved forward the gearing will impart to the chains a rearward movement, which will be faster than the motion of the machine in traveling forward. The shoes will press the rearwardly-moving portions of the chains strongly but resiliently against the stalks caught between the chains, whereby the stalks will be pulled from the earth and deposited upon the surface of the ground in the rear of the machine. To raise and lower the horizontal frame-sections and throw the gears into or out of engagement, it is simply necessary to turn the thumb-screws $b'$.

As shown in Fig. 4, the wheels and axle may be provided with the usual ratchet and pawl devices in order to permit the machine to be backed and turned with facility.

Having thus fully described my invention, what I claim is—

1. In a stalk puller, the combination of an axle and wheels, a frame depending therefrom, and having a longitudinal stalk-passage, an endless horizontal chain mounted on the frame on each side of said stalk passage and having its inner, rearwardly-moving portion over and parallel with said stalk passage, sprocket-wheels journaled on the frame and carrying said chains, mechanism driven from the axle for operating said sprocket-wheels, a supporting shoe and guide mounted on the frame on each side of the stalk passage and extending nearly the full length thereof, and means for normally pressing each shoe inwardly against the rearwardly-moving portion of the adjacent chain, substantially as described.

2. In a stalk puller, the combination of an axle and wheels, a frame depending from the axle and having a stalk passage centrally through it, a pair of horizontal chains mounted upon the frame and having their adjacent portions supported close together in the stalk passage, flanged shoes engaging the inner portions of the chains and pressing them toward each other, and mechanism for operating said chains, substantially as described.

In testimony whereof I affix my signature in presence of two witnesses.

ARTHUR EDWARDS.

Witnesses:
W. H. FEATHERINGILL,
R. F. MOFFITT.